July 25, 1967 N. C. KERN 3,333,266
DUAL SPECTRUM RADAR RANGING
Filed March 23, 1966
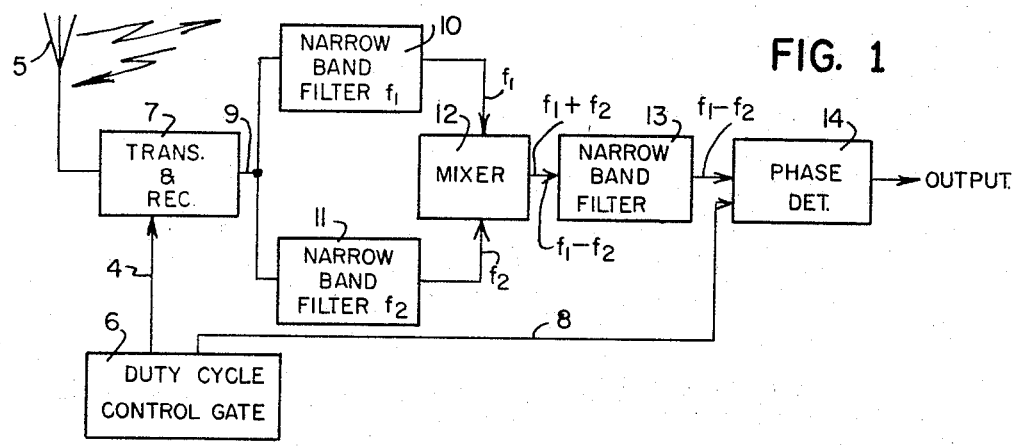
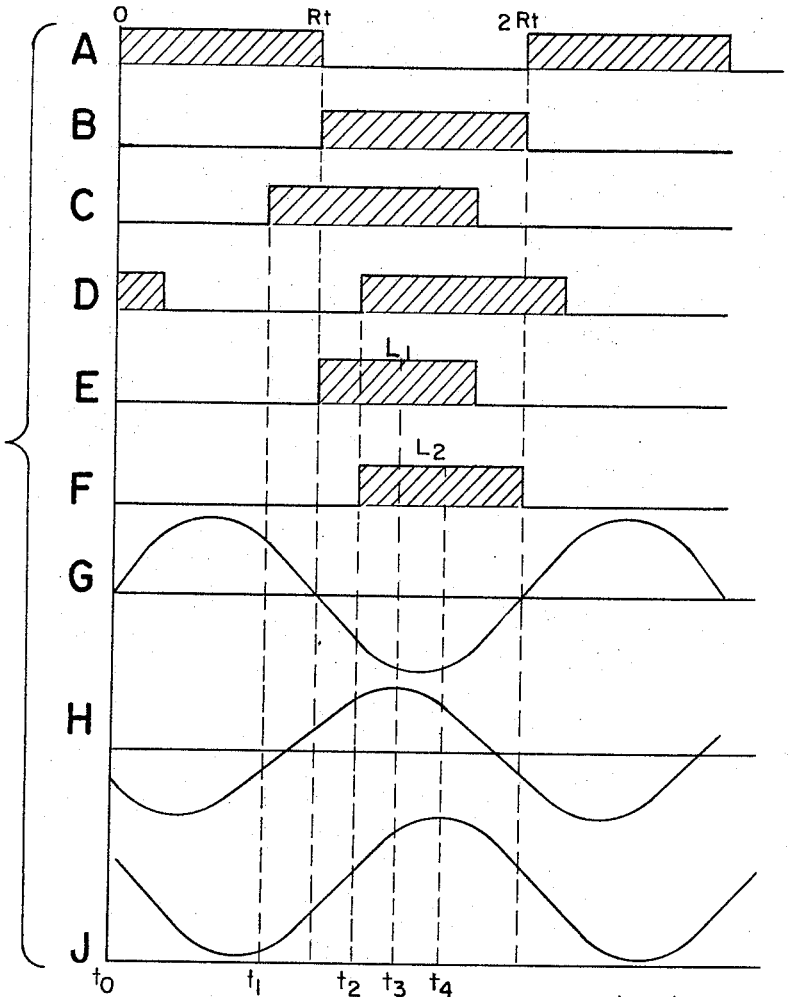
Inventor
NEIL C. KERN
BY
Mueller, Aichele & Rauner
ATTYS.

United States Patent Office 3,333,266
Patented July 25, 1967

3,333,266
DUAL SPECTRUM RADAR RANGING
Neil C. Kern, Phoenix, Ariz., assignor to Motorola, Inc., Franklin Park, Ill., a corporation of Illinois
Filed Mar. 23, 1966, Ser. No. 536,829
7 Claims. (Cl. 343—13)

ABSTRACT OF THE DISCLOSURE

A radar ranging system including a transmitter with a receiver having two band-pass filters for selectively passing only signals of frequencies in a harmonically related adjacent spectrum. The adjacent frequency signals are mixed and filtered to obtain a difference frequency signal equal to the repetition rate of the transmitter. The phase of the difference frequency signal is the same as the phase of the fundamental of the radar returned signal. The difference frequency signal is then phase compared with the transmitter signal to obtain a range indicating signal.

The present invention relates to an improved means and method for radar ranging by comparing the phase of the pulsed output signal of a radar repetition rate generator with the phase of the difference frequency signal between adjacent frequency lines in the frequency spectrum of the radar return signal.

One known method of radar ranging includes continuous wave transmission and reception of signals and subsequent phase comparison of the transmitted and received signals to obtain range information. This method, however, has the obvious disadvantage of requiring transmitter and receiver isolation by means other than time sharing.

Another known method for radar ranging which provides for a time sharing of the transmitter and receiver employs frequency modulation of the transmitted pulse and some means for comparing the modulation frequency with the detected FM signal to obtain range information. This method, however, is disadvantageous in that additional spectrum spreading is inherent wherever there is modulation, and this results in degrading the velocity resolution capabilities of the radar system.

The present invention possesses none of the aforedescribed disadvantages of the prior art methods for radar ranging and has for one object the provision of an improved radar ranging means and method wherein the transmitter is time shared with the receiver and wherein no additional modulation of the transmitted signal is necessary for ranging.

Another object of the invention is to provide an improved ranging system capable of measuring range to a target while transmitting signals at a high average power and relatively low peak power.

Another object of the invention is to provide a radar ranging method and means for producing a transmitted pulse of greater duration than the time required for range resolution.

Another object of the invention is to provide a new method for operating a radar ranging system which is adaptable to most known pulse Doppler radar tracking systems.

Another object of the invention is to provide a radar ranging system which does not require unambiguous velocity tracking in order to provide unambiguous range tracking.

Another object is to provide a system of the type described wherein the receiver input signal to noise ratio may be less than that required for normal velocity tracking.

Another object is to provide a system of the type described wherein the received signal Doppler shift is not a limitation on ranging.

Briefly described, the invention includes transmitting and receiving circuitry and first and second bandpass filters connected to this circuitry to receive target return (reflected) signals and to pass only signals of frequencies in harmonically related adjacent lines of the frequency spectrum of the return signal. These adjacent frequency signals are mixed and again filtered to obtain a difference frequency signal which is equal to the repetition rate of the radar transmitter. Since the phase of this difference frequency is the same as the phase of the fundamental spectrum line of the return signal, the phase of the difference frequency signal can be compared with the phase of the repetition rate generator to obtain range information output. Because only difference frequencies are used, the problem of detectng the repetition rate of the received signal in the presence of relative motion between the receiver and the point from which target return signals are reflected is removed. In addition, absolute phase calibration of the receiver is not required.

The invention which will be further described is shown in the accompanying drawing wherein:

FIG. 1 is a block diagram of the receiver according to the invention; and

FIG. 2 along ordinates A through J has waveform diagrams illustrating the relationships between the transmitted and received signals.

Referring to FIG. 1, there is shown radar transmitting and receiving equipment 7 with a common control gate 6 and a common antenna 5. The time sharing of the transmitter and receiver is controlled by a gating signal on line 4, and the pulse repetition frequency (PRF) reference output signal is connected at line 8 and the receiver output at line 9. A pair of narrow band filters 10 and 11 are connected to receive the transmitted pulse returns at 9 and have center frequencies $f1$ and $f2$ respectively. These filters 10 and 11 pass center frequencies $f1$ and $f2$ plus or minus a few cycles to either side of the center frequencies to the mixer 12. The narrow band filter 13 passes only the difference frequency $f1-f2$, plus or minus a few cycles, to the input of phase detector 14 where the difference frequency signal is compared with the fundamental frequency of the pulse repetition rate of the radar transmitter. If there is no relative motion between the receiver in FIG. 1 and the point from which target return signals are reflected, the mixing of any two adjacent spectrum lines in the mixer 12 will produce a difference frequency $f1-f2$ equal to the radar transmitter pulse repetition frequency (PRF). Since the phase of this difference frequency is the same as the phase of the fundamental spectrum line of the received signals at 9, a phase comparison of $f1-f2$ with the fundamental frequency of the transmitter PRF can be made with the advantage that phase detection is independent of transmitter frequency drift and the absolute phase shift introduced by the receiver.

Referring to FIG. 2, there are shown waveforms at the radar transmitter and receiver for different distances between the receiver and the point from which return signals are reflected. Along ordinate A there is shown the transmitter signal with a 50% duty cycle and a pulse length, $R_t$, corresponding in time to the estimated target detection range. This duty cycle is controlled by a gating signal at 4 in FIG. 1. At time $R_t$ the receiver is gated on (ordinate B) until time $2R_t$, the end of one PRF period. Along ordinate C and D are illustrations of the return pulse being received at a time $t1$ prior to $R_t$ and at a time $t2$ after $R_t$ respectively. In these situations respectively, the receiver of FIG. 1 only receives the pulses shown along ordinates E and F having lengths of L1 and L2.

Analysis of the pulse train with a constant repetition rate and a fixed pulse length shows that the fundamental frequency component of the train has a maximum amplitude at the center of each pulse and a period equivalent to the repetition rate, irrespective of the width of the pulse. Therefore, as the center of the gated target return pulses of ordinates E and F vary from $R_t$ to $2R_t$, when the target varies from zero range to a range corresponding to $2R_t$, the phase of the fundamental frequency of the transmitter PRF and that of the gated target return varies by 180°.

The signal shown along ordinate G represents the fundamental frequency of the transmitter PRF and ordinates H and J show the fundamental frequency waveforms for the gated target return pulses in ordinates E and F respectively. At time $t3$ the mid point of the pulse width L1 corresponds to the maximum point on its fundamental frequency wave in ordinate H and at time $t4$ the mid point of pulse width L2 corresponds to the maximum point on its fundamental frequency waveform in ordinate J. Therefore, as the target return pulses of lengths L1 or L2 arrive at the receiver, the phase of their fundamental waveforms (ordinates H or J) may be compared with that of the fundamental frequency of the transmitter PRF (ordinate G) at the phase detector 14 to give an output voltage proportional to target range. However, as described above, in FIG. 1 it is a difference frequency signal equal in phase to the fundamental frequency in ordinates H or J that is compared to the fundamental frequency of the transmitter PRF.

The inventive method described above allows the input signal-to-noise ratio required for ranging to be less than the signal-to-noise ratio required for velocity tracking since the range tracker filter 13 bandwidth is limited only by the range accuracy requirements. By using any pair of adjacent spectrum lines in the frequency spectrum of the gated target return pulse to obtain a difference frequency signal, the problem of Doppler frequency shift due to target motion is eliminated.

In one radar receiver built identical to the one shown in FIG. 1 the narrow band filters 10 and 11 had a bandwidth of 14 cycles with a frequency separation of 1,023 cycles and center frequencies located about 300 kc. The narrow band filter 13 at the output of mixer 12 had a center frequency of 1,023 cycles per second and passed only the difference frequency, $f1-f2$.

What is claimed is:

1. A method for radar ranging comprising the steps of:
    (a) transmitting a signal at a predetermined repetition rate at a radar transmitter,
    (b) gating on a receiver for receiving target return signals of the transmitted signals, and
    (c) comparing the phase of the fundamental frequency of said repetition rate with the phase of the difference frequency between two harmonically related adjacent spectrum lines of said return signals whereby range information from the point of signal return to said receiver is obtained as a linear function of the phase difference between compared signals.

2. The method according to claim 1 which includes:
    (a) filtering any pair of adjacent harmonically related frequencies in the frequency spectrum of said return signals,
    (b) mixing said adjacent frequencies to obtain a difference frequency signal, and
    (c) detecting the phase difference between said difference frequency signal and the fundamental frequency signal of said repetition rate.

3. The method according to claim 2 wherein said adjacent frequencies lie in a pair of immediately adjacent spectrum lines thereby producing a difference frequency equal to said repetition rate of said transmitter when there is no relative motion between the point of signal return and said receiver.

4. A system for radar ranging including in combination:
    (a) means for transmitting a microwave signal at a predetermined repetition rate,
    (b) means for receiving transmitted signal returns reflected from a target,
    (c) means for gating on said receiving means when said transmitting means are turned off, and
    (d) means for comparing the phase of the fundamentals frequency of the repetition rate of said transmitting means with the phase of the difference frequency between two adjacent spectrum lines in the frequency spectrum of said reflected signals.

5. The system according to claim 4 including:
    (a) first and second filter means connected to receive the transmitted signal returns, said filter means having center frequencies equal to the frequencies of a pair of harmonically related adjacent frequencies in the frequency spectrum of the signal returns,
    (b) means for mixing said two adjacent frequencies passed by said first and second filter means, and
    (c) means connected to said mixing means and to a source of the fundamental frequency signals of said predetermined repetition rate for detecting the phase difference between the difference frequency signals appearing at the output of said mixing means and the fundamental frequency signal of said predetermined repetition rate of said transmitting means.

6. The system according to claim 5 wherein said adjacent frequencies in said frequency spectrum differ by an amount equal to the said repetition rate of the transmitting means.

7. The system according to claim 6 wherein:
    (a) said transmitting means has a pulse repetition frequency with a 50% duty cycle, and
    (b) means connected to said transmitting and receiving means for time sharing said receiving means and said transmitting means.

References Cited
UNITED STATES PATENTS 3,114,909   12/1963   Varela _____ 343—13 X RODNEY D. BENNETT, *Primary Examiner.*

C. L. WHITHAM, *Assistant Examiner.*